Patented Apr. 12, 1938

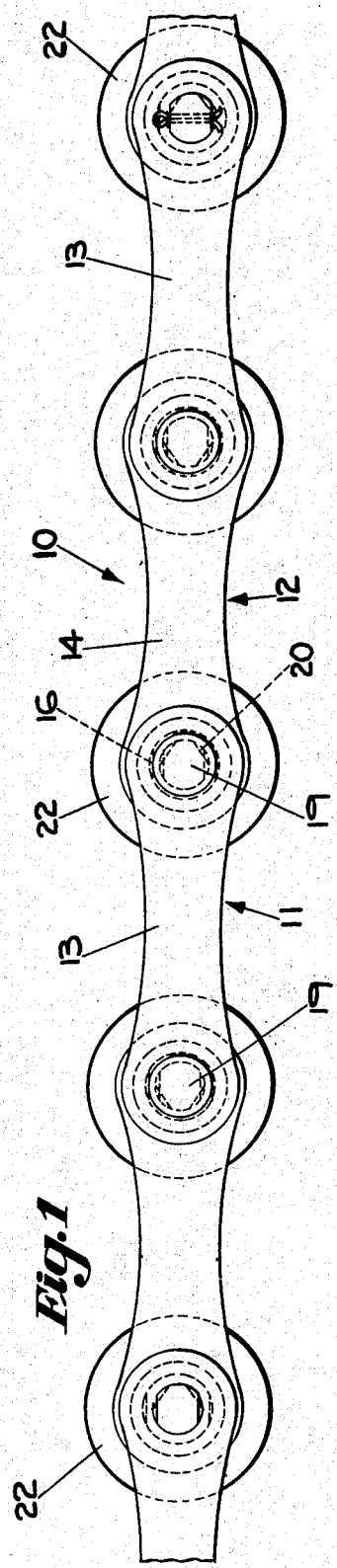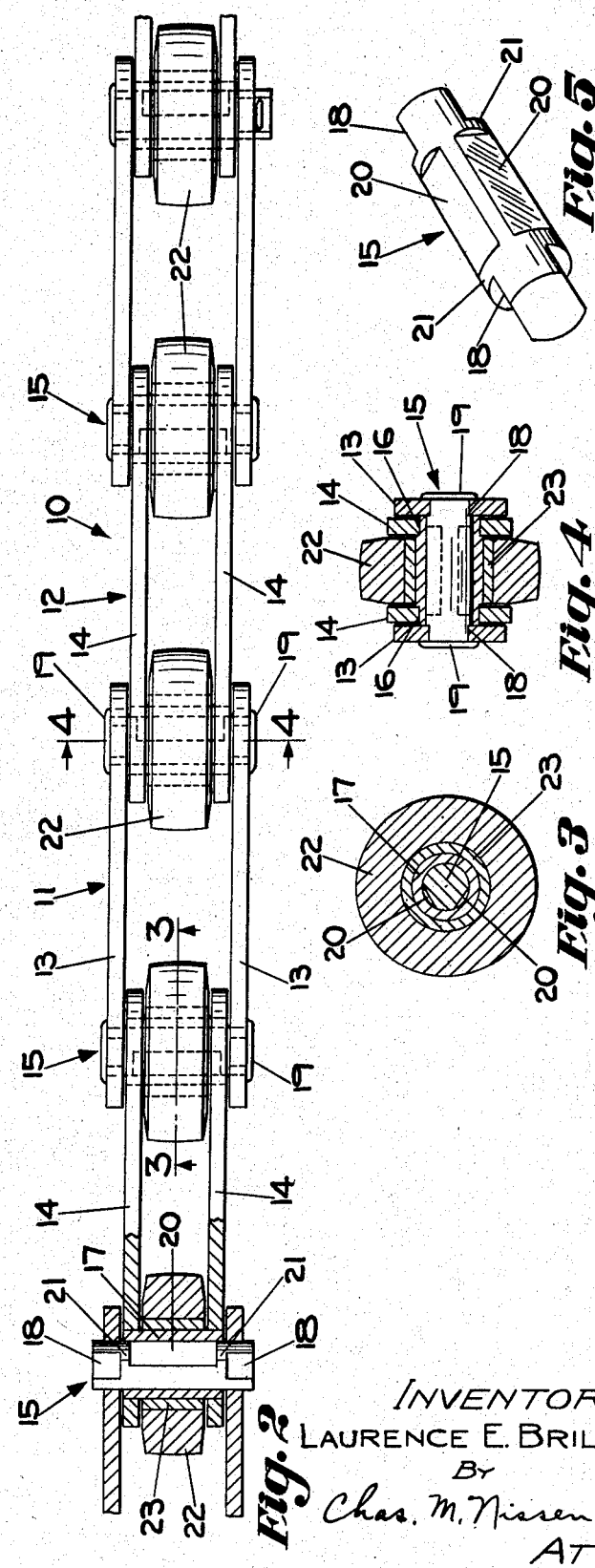

2,113,980

UNITED STATES PATENT OFFICE 2,113,980

CHAIN

Laurence E. Brill, Columbus, Ohio, assignor to The Jeffrey Manufacturing Company, a corporation of Ohio Application July 1, 1936, Serial No. 88,454

2 Claims. (Cl. 74—257)

This invention relates to a draft chain and one object of the invention is to provide a chain which requires substantially no lubrication after it is once assembled, it being lubricated during the process of construction to last for the life of the chain.

Another object of the invention is to provide a simple, yet very efficient, chain pintle which will lubricate itself and the associated chain thimble.

Other objects of the invention will appear hereinafter, the novel features and combinations being set forth in the appended claims.

In the accompanying drawing,

Fig. 1 is a side elevational view of a portion of a chain comprising my invention;

Fig. 2 is a plan view of the chain of Fig. 1 with one of the pintles and associated parts shown in section;

Fig. 3 is a transverse sectional view taken on the line 3—3 of Fig. 2 looking in the direction of the arrows;

Fig. 4 is a longitudinal sectional view taken on the line 4—4 of Fig. 2 looking in the direction of the arrows; and Fig. 5 is a perspective view of the pintle comprising my invention.

In certain installations it is extremely desirable to provide draft chains which require no lubrication whatever throughout their life due to various conditions, such as inaccessibility. The chain comprising my invention is of this type and provides a very simple, yet effective, construction which requires no lubrication throughout the entire normal life of the chain.

Referring to the accompanying drawing, the chain 10 comprises a plurality of interconnected links 11 and 12, the former being formed by outside sidebars 13, 13, and the latter being formed by inside sidebars 14, 14. The ends of each of the links 11 are rigidly attached to pintles 15 in a manner hereinafter described more in detail, to form a substantially rigid link 11. The sidebars 14, 14 of the inner links 12 are provided with non-circular openings at their ends which cooperate with non-circular shoulders 16, 16 (Fig. 4) of a steel thimble 17 which is adapted to fit over the pintle 15.

As best seen in Figs. 4 and 5 of the drawing, the pintle 15 is provided with non-circular end shoulders 18, 18 which fit into non-circular openings in the sidebars 14, 14 and make a rigid contact between said pintle 15 and said sidebars 14, 14 by virtue of peened or spun heads 19, 19. That is, the shoulders 18, 18 will be spun over or peened to provide heads 19, 19, which will provide a rigid fit between the pintles 15, and the outside sidebars 13, 13 of the links 11. It may also be mentioned that the non-circular openings in the inside sidebars 14, 14 have a tight press fit with the shoulders 16, 16 of the thimble 17.

In order to provide lifetime lubrication between the bearing surfaces of the pintle 15 and the cooperating inner bearing surface of the thimble 17, I provide the pintle 15 with a pair of grooves 20. It is to be noted that the pintle 15 is generally cylindrical in shape and the grooves 20 may be formed by milling said pintle 15, as best illustrated in Figs. 3 and 5 of the drawing. It is to be noted that there is a continuous unbroken cylindrical bearing surface of approximately 180° arc afforded between the cylindrical body of the pintle 15 and the inner bearing surface of the thimble 17. It is this bearing surface which takes the forces pulling on the chain 10 during normal operation. It is also to be noted that diametrically opposite this main bearing surface is a smaller but continuous unbroken cylindrical bearing surface which takes the forces when said chain is stopped suddenly. These bearing surfaces are spaced circumferentially by the grease grooves 20.

It is also to be noted that the grooves 20 do not extend the full length of the main body of the pintle 15 but terminate short thereof, providing at each end of said main body, inward of the shoulders 18, a complete cylinder 21. That is, there is a complete cylindrical surface 21 at each end of the pintle 15 inwardly of the shoulder 18. This has a number of important advantages. In the first place, it defines a definite end barrier for the grooves 20 which are adapted to receive a lubricant, such as grease, and, in cooperating with the interior cylindrical surface of the receiving thimble 17, to make a completely enclosing grease well or pocket independent of the attachment between the pintle 15 and the sidebars 13.

Another important feature provided by the cylinders 21, 21 is that the pintles 15 may be ground without centers even after the grooves 20 have been milled. That is, said pintles 15 may be ground in the manner that roller bearings are ground even after the grooves 20 are formed, this being effected without requiring the centering of the pintle 15 on a machine, such as a lathe.

Associated with the chain 10 and carried upon each of the thimbles 17 is a roller wheel 22 preferably of hardened steel, which is adapted to roll along a trackway and support the chain 10.

To provide a greaseless bearing between the roller wheel 22 and the outer cylindrical surface of the thimble 17, I provide a greaseless bronze bushing 23 which has a press fit with the roller wheel 22 and provides a bearing for said roller wheel 22 on said thimble 17. The bronze bushing 23 does not require lubrication due to its particular construction, in that it is formed with impregnated graphite which supplies sufficient lubrication therefor throughout its life.

It is to be noted that the only movement which takes place between the pintle 15 and the thimble 17 is somewhat restricted and takes place only when there is articulation between the links 11 and 12. The grease provided in the grooves or pockets 20 is sufficient to supply lubrication for said pintle 15 and thimble 17 for the entire life of the chain.

Obviously those skilled in the art may make various changes in the details and arrangement of parts without departing from the spirit and scope of the invention as defined by the claims hereto appended, and I therefore wish not to be restricted to the precise construction herein disclosed.

Having thus described and shown an embodiment of my invention, what I desire to secure by Letters Patent of the United States is:

1. In a chain, the combination with a pair of links formed by side bars, of a hollow thimble having an unbroken cylindrical bore and attached at opposite ends to rotate with the side bars of one of said links, a pintle extending into said bore and attached at each end to rotate with the side bars of the other of said links, said pintle being formed to provide complete cylindrical bearing surfaces at each end which contact said cylindrical bore and providing a plurality of circumferentially spaced elongated grease pockets extending between said cylindrical bearing surfaces, and having two circumferentially spaced diametrically oppositely positioned unbroken bearing surfaces in contact with said unbroken cylindrical bore, one of said unbroken bearing surfaces being a segment of a cylinder of substantially 180 degrees and being positioned to bear the normal load transferred between adjacent links of said chain, said unbroken bearing surfaces extending continuously between said cylindrical bearing surfaces and being circumferentially spaced apart by said grease pockets.

2. In a chain, the combination with a pair of links each formed by side bars, of a hollow barrel having a generally cylindrical bore connecting the side bars of one of said links, a pintle connected to the side bars of the other link and extending through said hollow barrel, said pintle being formed to provide spaced continuous cylindrical bearing surfaces at opposite ends which bear on cooperating cylindrical surfaces in said barrel, an elongated totally enclosed grease pocket of substantial size formed in said pintle and extending between said spaced cylindrical bearing surfaces, said pintle providing circumferentially spaced oppositely positioned bearing areas each a continuous segment of a cylinder extending between said continuous cylindrical bearing surfaces, one of which subtends a relatively small angle and the other of which subtends an angle of approximately 180 degrees, said large bearing surfaces being positioned to carry the normal load on said chain when traveling rectilinearly and said small bearing surface carrying the stopping load.

LAURENCE E. BRILL.